United States Patent [19]

Cheresnowsky et al.

[11] Patent Number: 4,724,128
[45] Date of Patent: Feb. 9, 1988

[54] METHOD FOR PURIFYING MOLYBDENUM

[75] Inventors: Michael J. Cheresnowsky, Towanda; Edward L. Bok, Sayre; Martin B. MacInnis, Towanda, all of Pa.

[73] Assignee: GTE Products Corporation, Stamford, Conn.

[21] Appl. No.: 75,802

[22] Filed: Jul. 20, 1987

[51] Int. Cl.⁴ .............................................. C01G 37/00
[52] U.S. Cl. ..................................... 423/53; 423/593; 423/606
[58] Field of Search ........................ 423/53, 606, 593

[56] References Cited

U.S. PATENT DOCUMENTS

| | | | |
|---|---|---|---|
| 3,932,580 | 1/1976 | Vertes et al. | 423/56 |
| 3,991,156 | 11/1976 | Ronzio et al. | 423/53 |
| 4,587,109 | 5/1986 | Lyavdet et al. | 423/56 |
| 4,596,701 | 6/1986 | Cheresnowsky et al. | 423/56 |
| 4,612,172 | 9/1986 | Brunelli et al. | 423/56 |
| 4,643,884 | 2/1987 | Cheresnowsky et al. | 423/53 |

Primary Examiner—Stephen J. Lechert, Jr.
Attorney, Agent, or Firm—Donald R. Castle; L. Rita Quatrini

[57] ABSTRACT

A method is disclosed for purifying molybdenum which involves reducing a molybdenum compound selected from the group consisting of molybdenum trioxide, ammonium dimolybdate, and ammonium paramolybdate to molybdenum dioxide which is then water washed to remove potassium, and produce a purified molybdenum dioxide having a potassium content of no greater than about 30 weight ppm, followed by separating the wash water from the purified molybdenum dioxide.

1 Claim, No Drawings

METHOD FOR PURIFYING MOLYBDENUM

This invention relates to a method for purifying molybdenum which involves water washng molybdenum dioxide to reduce the potassium content.

BACKGROUND OF THE INVENTION

Molybdenum compounds of high purity are required for various applications such as in catalysts, etc.

Heretofore there have been a number of procecesses for upgrading relatively impure molybdenum compounds.

U.S. Pat. No. 3,957,946 discloses a process for purifying molybdenum which involves subjecting impure concentrates of molybdenum trioxide to oxidative roasting, followed by ammoniacal leaching of the molybdic trioxide to produce ammonium molybdate which is further purified by passage through a chelating cation exchange resin.

U.S. Pat. Nos. 3,848,049 and 3,829,550 disclose purification processes for molybdenum which involve leaching of molybdenum trioxide with dilute nitric acid.

U.S. Pat. No. 3,694,147 discloses a process for purifying molybdenum trioxide of impurities such as lead, copper, iron, and zinc and some alkaline earths by leaching with an aqueous solution and an ammonium salt of the halide.

U.S. Pat. No. 3,860,419 relates to the process for recovering molybdenum from molybdenum concentrates by digesting the concentrate in an aqueous nitric acid solution containing ammonium nitrate, separating the solid phase from the liquid phase, and treating the solid phase with ammonium hydroxide to produce ammonium molybdate.

U.S. Pat. No. 4,079,116 relates to a process for producing high purity ammonium molybdate, ammonium heptamolybdate or ammonium dimolybdate from a molybdenum oxide concentrate by a series of operations which involve cation removal, leaching, etc.

In the above processes, some impurities remain to contaminate the product.

Potassium in molybdenum can interfere with sintering, resulting in low density. Potassium is a particularly difficult impurity to remove. When U.S. Pat. No. 3,860,419 is followed for purifying molybdenum, the potassium is not sufficiently reduced for use as high purity material.

U.S. Pat. No. 3,393,971 relates to a process of reroasting molybdenum trioxide followed by water washing the molybdenum trioxide and then forming an ammonium molybdate (AM) solution from which ammonium paramolybdate (APM) is produced. The APM is then oxidized to produce pure molybdenum trioxide.

SUMMARY OF THE INVENTION

In accordance with one aspect of this invention, there is provided a method for purifying molybdenum which involves reducing a molybdenum compound selected from the group consisting of molybdenum trioxide, ammonium dimolybdate, and ammonium paramolybdate to molybdenum dioxide which is then water washed to remove potassium and produce a purified molybdenum dioxide having a potassium content of no greater than about 30 weight ppm, followed by separating the wash water from the purified molybdenum dioxide.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

This invention relates to the purification of molybdenum especially with respect to potassium. It is desirable that potassium in molybdenum be reduced as low as possible. Levels in the range of about 200 weight ppm and even as low as about 80 ppm are undesirable because they cause problems such as lower density after pressing and higher strain hardening coefficients in the molybdenum metal produced therefrom.

The starting molybdenum to be purified by the method of this invention is relatively pure molybdenum trioxide, ammonium dimolybdate or ammonium paramolybdate. The major criterion is that the potassium in the starting molybdenum compound be no greater than about 200 weight ppm. The method does not work efficiently if the potassium content is higher than this. It is sometimes desirable that these molybdenum compounds be prepurified by known methods to reduce the impurity levels to no greater than about 200 ppm.

The staring moybdenum compound of this invention can be pre-purified, that is the potassium content can be reduced to no greater than about 200 weight ppm in any number of ways. For example, technical grade molybdenum trioxide can be subjected to known purification methods. The pre-purified molybdenum trioxide which must have a potassium content of no greater than about 200 weight parts per million can then be subjected to the method of this invention to further reduce the potassium level.

One method of pre-purifying molybdenum trioxide is by washing it with water or acids to purify it before the reduction to the dioxide. This step is carried out if the potassium level is greater than about 200 weight ppm.

Acid leaching of technical grade molybdenum trioxide is a known method to remove potassium from molybdenum. However, all of the potassium is not removed by this processing.

Water washing of technical grade molybdenum trioxide is also used. A disadvantage of this is the significant loss of Mo to the water. The Mo must be recovered for economy. Also technical grade molybdenum trioxides are re-roasted to maximize separation of K from Mo. One method requires re-roasted trioxide to be cooled very quickly. The re-roasting and quick cooling are costly operations.

The starting molybdenum compound to be reduced according to the method of this invention to molybdenum dioxide is either molybdenum trioxide, ammonium dimolybdate, or ammonium paramolybdate.

The starting molybdenum compound is reduced to molybdenum dioxide by standard methods.

When the molybdenum dioxide is obtained, it is water washed to remove the potassium followed by removal of the wash water. This can be done by any technique known in the art. For example, it can be done by slurrying the molybdenum dioxide in water. It is preferred to have a relatively dilute slurry for optimum contact of the molybdenum dioxide particles with the water, But the amount of water, must not be excessive, so that the process remains cost effective. Typically, the slurry is such that the solids content is from about 20% to about 50% by weight. The resulting wash water is then separated from the purified molybdenum dioxide by any standard technique such as filtration or decantation.

Another technique of washing is discharging the molybdenum dioxide from the calciner after the reduction step to a belt filter that passes beneath a water spray. It is believed that the reason that the potassium can be reduced so low by washing the molybdenum dioxide is that the potassium is on the surface of the dioxide as a result of being exposed to the high temperatures of the prior reduction step. Therefore it can be washed off easily. If the potassium is in the bulk of the molybdenum dioxide, it would not be able to be washed off.

By the method of this invention, the potassium level is reduced to no greater than about 30 weight ppm. At these low levels, potassium does not pose problems in the molybdenum.

One prior art technique for removing K from molybdenum dioxide is to use temperature of final reduction to $MoO_2$ to Mo as the basis for removing the K. The disadvantage of this technique is the inability to use lower temperatures, at which certain desirable powder properties are obtained such as extremely fine particle sizes.

To more fully illustrate this invention, the following nonlimiting examples are presented.

EXAMPLE 1

ADM is reduced to molybdenum dioxide which contains 80 weight ppm potassium and 10 weight ppm sodium. Twenty grams of $MoO_2$ are slurried with 80 grams of pure water, rapidly at room temperature for about 1 hour. The $MoO_2$ is separated from the wash water and dried. The washed $MoO_2$ contains about 30 weight ppm K and <5 ppm Na.

EXAMPLE 2

ADM is reduced to molybdenum dioxide, which contains about 86 weight ppm K and about 6 weight ppm Na. About 81 g of molybdenum dioxide is stirred rapidly in about 400 ml of water for about 1 hour at room temperature. The molybdenum dioxide is separated from the water and dried. It contains about 30 weight ppm K and <5 weight ppm Na.

While there has been shown and described what are at present considered the preferred embodiments of the invention, it will be obvious to those skilled in the art that various changes and modifications may be made therein without departing from the scope of the invention as defined by the appended claims.

What is claimed is:

1. A method for purifying molybdenum, said method comprising:
   (a) reducing a molybdenum compound selected from the group consisting of molybdenum trioxide, ammonium dimolybdate, and ammonium paramolybdate to molybdenum dioxide, said molybdenum compound being in the relatively pure state so that the potassium content of said molybdenum compound is no greater than about 200 weight ppm;
   (b) water washing said molybdenum dioxide to remove potassium therefrom and produce a purified molybdenum dioxide having a potassium content of no greater than about 30 weight ppm; and
   (c) separating the resulting wash water from said purified molybdenum dioxide.

* * * * *